W. S. LAUGHLIN.
WHEEL.
APPLICATION FILED APR. 6, 1909.
934,408.
Patented Sept. 14, 1909.
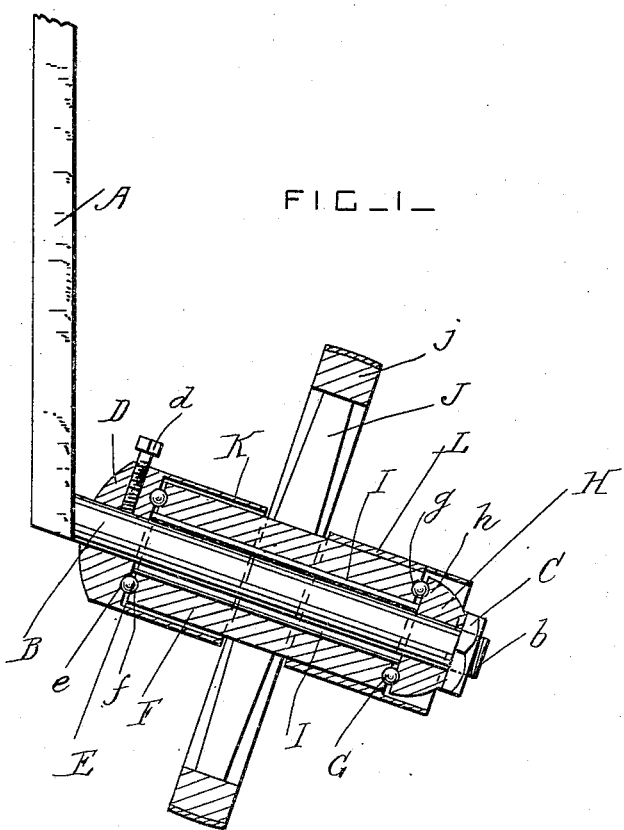
FIG_1_
FIG_2_
Witnesses
L. B. Middleton
Wm. Mister
Inventor
William S. Laughlin
By Herbert W. Jenner
Attorney

UNITED STATES PATENT OFFICE.

WILLIAM S. LAUGHLIN, OF ECKMAN, NORTH DAKOTA, ASSIGNOR OF ONE-HALF TO WILLIAM DAHLQUIST, OF ECKMAN, NORTH DAKOTA.

WHEEL.

934,408.  Specification of Letters Patent.  Patented Sept. 14, 1909.

Application filed April 6, 1909. Serial No. 488,264.

*To all whom it may concern:*

Be it known that I, WILLIAM S. LAUGHLIN, a citizen of the United States, residing at Eckman, in the county of Bottineau and State of North Dakota, have invented certain new and useful Improvements in Wheels; and I do hereby declare the following to be a full, clear, and exact description of the invention, such as will enable others skilled in the art to which it appertains to make and use the same.

This invention relates to guide wheels for plows and other similar agricultural implements; and it consists in the novel construction and combination of the parts hereinafter fully described and claimed.

In the drawings, Figure 1 is a longitudinal section through the hub of the wheel. Fig. 2 is an end view of the hub.

A is a supporting bar which is secured to the frame of the plow or other implement in any approved manner.

B is a spindle which projects at an obtuse angle from the lower end of the bar A, and which is provided at its free and lower end with a screwthreaded portion $b$ and a nut C.

D is an adjustable collar secured on the spindle B by means of a set-screw $d$, and provided with a ball-race $e$.

F is the hub of the wheel, formed of a long tubular sleeve provided with a ball-race $f$ at one end and a ball-race $g$ at its other end.

E are antifriction balls which run in the ball-races $e$ and $f$.

H is a dust collar formed on or secured to the nut C, and provided with a ball-race $h$.

G are antifriction balls which run in the ball-races $g$ and $h$.

I are antifriction rollers interposed between the hub F and the spindle B.

J are the spokes of the wheel which project radially from the middle part of the hub, and $j$ is the wheel-rim carried by the said spokes.

K is a cylindrical guard formed on or secured to the upper collar D and projecting over the upper portion of the hub of the wheel nearly as far as the spokes.

L is a cylindrical guard secured to the lower part of the wheel hub, and projecting over the dust collar H.

The wheel rim runs on the ground, the spindle B being supported at an acute angle of about 20° with the horizontal. The hub is made very long so that it runs with very little friction, and the two guard cylinders K and L prevent the entrance of dirt to the bearings, and shed off any dirt and trash which falls upon them, and prevent trash from becoming entangled with the spokes of the wheel.

What I claim is:

1. The combination, with a support provided with a spindle arranged at an acute angle with the horizontal, of a wheel provided with a hub which is journaled on the said spindle, a non-revoluble collar secured on the upper end portion of the spindle and provided with a tubular guard which incloses the upper end portion of the wheel hub and prevents trash from accumulating against the upper side of the wheel, a retaining collar secured on the lower end portion of the spindle, and a revoluble guard secured to the lower end portion of the said wheel hub and projecting over the said retaining collar.

2. The combination, with a supporting bar, and a spindle connected to the said bar and arranged at an acute angle with the horizontal; of a collar secured on the lower end of the spindle, a wheel having a long hub journaled on the said spindle and provided with spokes at its middle part, a cylindrical guard secured to the lower part of the wheel hub and projecting over the said collar, a collar secured to the upper part of the said spindle, a cylindrical guard projecting from the last said collar and extending over the hub of the wheel nearly as far as the spokes, antifriction balls interposed between the two said collars and the respective ends of the hub, and antifriction rollers interposed between the said hub and spindle.

In testimony whereof I have affixed my signature in the presence of two witnesses.

WILLIAM S. LAUGHLIN.

Witnesses:
 WM. DAHLQUIST,
 D. H. HAMILTON.